US008453299B2

(12) United States Patent
Li et al.

(10) Patent No.: US 8,453,299 B2
(45) Date of Patent: Jun. 4, 2013

(54) CONNECTING MODULE AND SLIDING MECHANISM FOR ELECTRONIC DEVICE

(75) Inventors: Jian-Wei Li, Shenzhen (CN); Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 4 days.

(21) Appl. No.: 13/301,967

(22) Filed: Nov. 22, 2011

(65) Prior Publication Data

US 2012/0308296 A1 Dec. 6, 2012

(30) Foreign Application Priority Data

May 31, 2011 (CN) .......................... 2011 1 0144462

(51) Int. Cl.
*E05D 3/06* (2006.01)
(52) U.S. Cl.
USPC ................... 16/366; 16/257; 16/381; 16/386; 16/359; 16/357
(58) Field of Classification Search
USPC .................. 16/297, 299, 335, 337, 339, 355, 16/357, 360, 374, 286, 380–382; 361/679.08, 361/679.11, 679.02, 679.15, 679.27; 455/90.3, 455/575.1, 575.3, 575.8; 379/433.12, 433.13; 348/373, 333.01, 333.06, 794; 403/154, 155, 403/161; 411/522–524
See application file for complete search history.

(56) References Cited

U.S. PATENT DOCUMENTS

| | | | | | |
|---|---|---|---|---|---|
| 2,278,708 | A | * | 4/1942 | Miller | 72/332 |
| 4,822,965 | A | * | 4/1989 | Hyogo et al. | 200/333 |
| 4,960,256 | A | * | 10/1990 | Chihara et al. | 248/286.1 |
| 5,628,089 | A | * | 5/1997 | Wilcox et al. | 16/303 |
| 5,704,100 | A | * | 1/1998 | Swan | 24/656 |
| 6,305,870 | B1 | * | 10/2001 | Mita et al. | 403/254 |
| 6,530,123 | B1 | * | 3/2003 | Wahlstedt | 16/342 |
| 7,065,835 | B2 | * | 6/2006 | Kuramochi | 16/357 |
| 7,100,244 | B2 | * | 9/2006 | Qin et al. | 16/330 |
| 7,278,184 | B2 | * | 10/2007 | Kuramochi | 16/357 |
| 7,929,285 | B2 | * | 4/2011 | Shen | 361/679.21 |
| 2012/0120561 | A1 | * | 5/2012 | Lu et al. | 361/679.01 |
| 2012/0236476 | A1 | * | 9/2012 | Wu et al. | 361/679.01 |

* cited by examiner

*Primary Examiner* — Chuck Y. Mah
(74) *Attorney, Agent, or Firm* — Altis Law Group, Inc.

(57) ABSTRACT

A connecting module includes a mounting portion, a pin and a washer. The mounting portion defines a receiving groove and two latching grooves positioned at opposite sides of the receiving groove. The pin extends through the mounting portion. The washer includes a washer body and two extending arms protruding from opposite sides of the washer body, each extending arm having an arcuate portion. The washer body is received in the receiving groove and is fitted around the pin, the extending arms are received in the latching grooves, and each arcuate portion is latched in a corresponding latching groove.

9 Claims, 6 Drawing Sheets

CONNECTING MODULE AND SLIDING MECHANISM FOR ELECTRONIC DEVICE

BACKGROUND

1. Technical Field

The present disclosure generally relates to electronic devices, and particularly to a connecting module and a sliding mechanism for an electronic device.

2. Description of Related Art

Portable electronic devices such as mobile phones, laptops, and personal digital assists (PDAs) are widely used. As such, the sales and use of slide-type portable electronic devices have been on the increase. A slide-type portable electronic device has two housings, which can open and close relative to each other with the use of a sliding mechanism.

A joint structure is used for connecting the sliding mechanism and the housings. The joint structure is usually complicated. Additionally, the joint structure will have a lot of play which reduces reliability of the joint structure.

Therefore, there is room for improvement within the art.

BRIEF DESCRIPTION OF THE DRAWINGS

Many aspects of the connecting module and the sliding mechanism for electronic device can be better understood with reference to the following drawings. The components in the drawings are not necessarily to scale, the emphasis instead being placed upon clearly illustrating connecting module and the sliding mechanism for electronic device. Moreover, in the drawings, like reference numerals designate corresponding parts throughout the several views.

DETAILED DESCRIPTION

Figure 1:
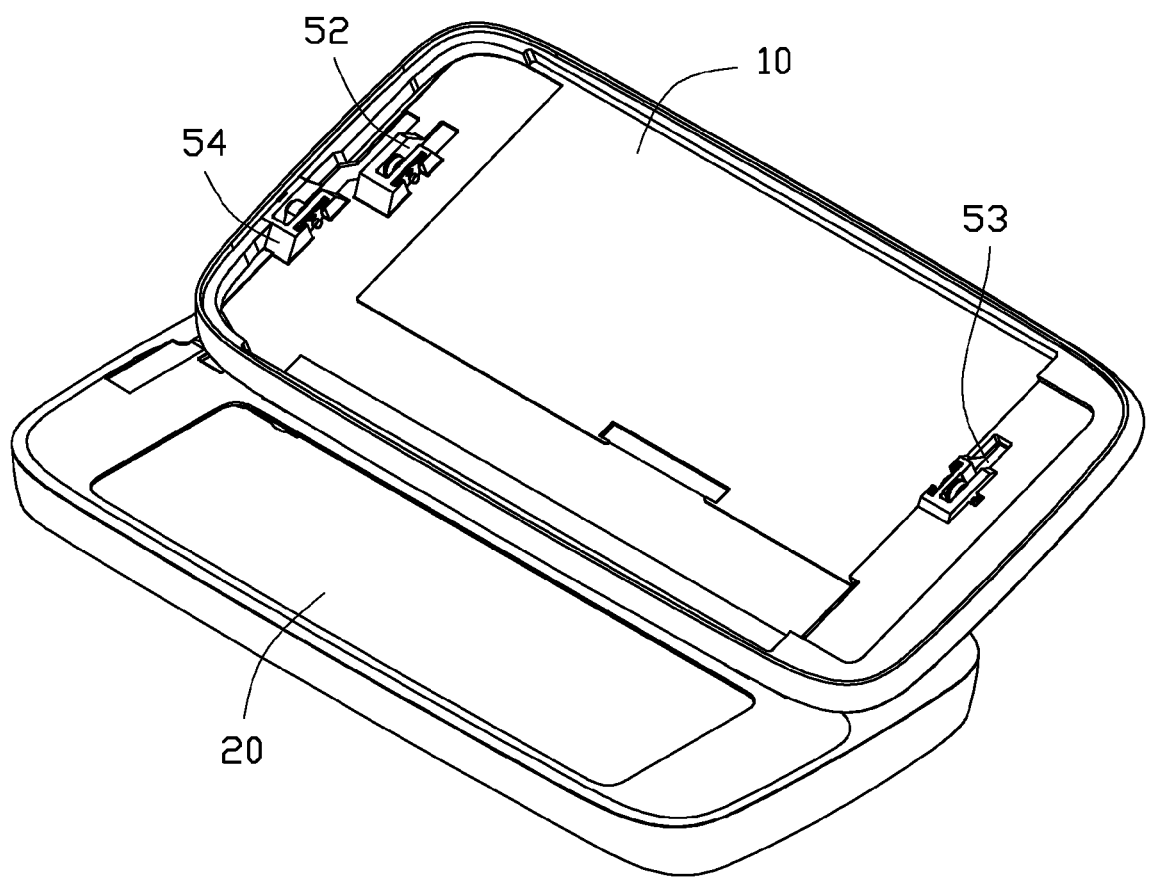
FIG. 1 is an isometric view of an assembled sliding mechanism according to an exemplary embodiment.
Figure 2:
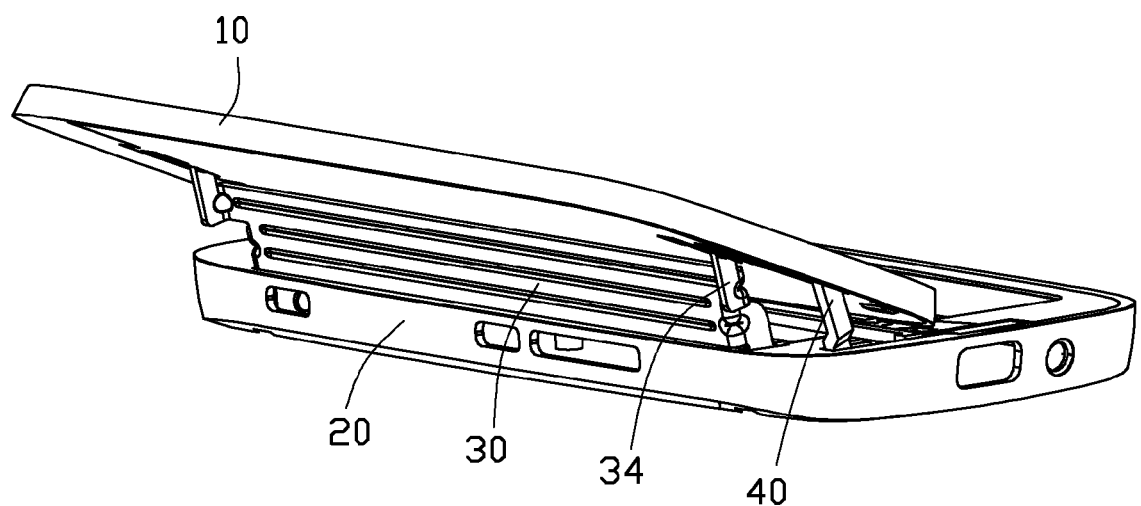
FIG. 2 is similar to FIG. 1, but shown from another aspect.
Figure 3:
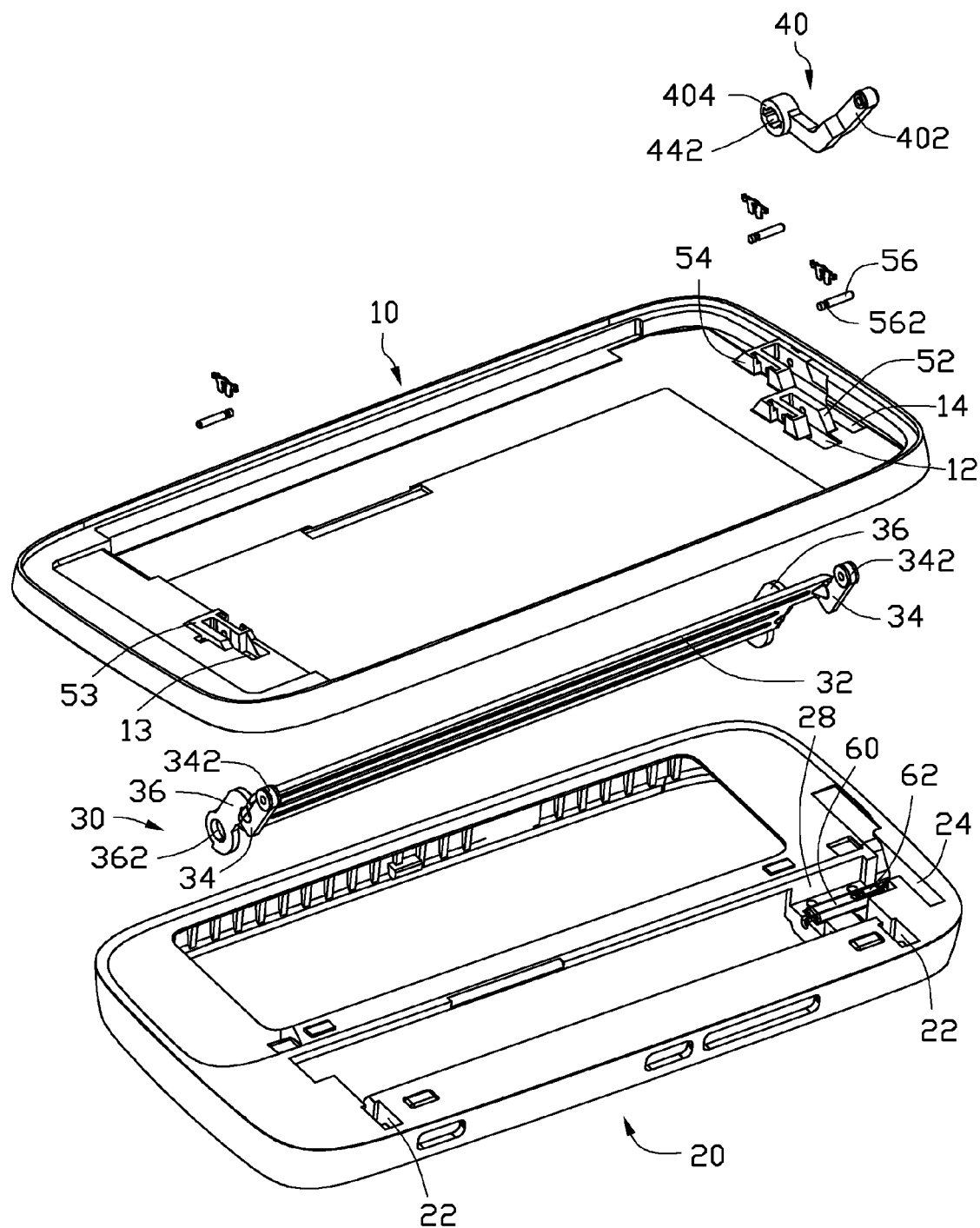
FIG. 3 is an exploded, isometric view of the sliding mechanism.

FIG. 1 to FIG. 3 show an exemplary embodiment of a sliding mechanism 100 applied in an electronic device, such as a mobile phone. The sliding mechanism 100 can be in a flat, closed orientation and a tilted, open orientation. In the flat, closed orientation, the first section 10 and the second section 20 overlap each other. In the tilted, open orientation, the first section 10 is tilted relative to the second section 20 for better viewing. The sliding mechanism 100 includes a first section 10, a second section 20, a pivot plate 30, an assist lever 40, three connecting modules 50, and a hinge module 60. The connecting modules 50 respectively include a mounting portion 52, 53, 54, and each module 50 includes a pin 56 and a washer 58.

The first section 10 defines three slots 12, 13 and 14, and the three mounting portions 52, 53, 54 respectively ride in the slots 12, 13, 14. In this exemplary embodiment, the mounting portions 52, 53 are formed at opposite sides of a surface of the first section 10 and connected to one side of the pivot plate 30. The mounting portion 54 is adjacent to the mounting portion 52 and connected to one end of the assist lever 40.

The second section 20 defines two notches 22 at opposite sides of a surface to connect to the other side of the pivot plate 30. A slit 24 is defined in the surface of the second section 20 adjacent to one of the notches 22. The other end of the assist lever 40 is connected to the slit 24. A receiving portion 28 is formed on the second section 20 communicating with the slit 24 and the adjacent notch 22. The hinge module 60 is positioned on the receiving portion 28. The hinge module 60 includes a cam member 62 non-rotatably connected to the other end of the assist lever 40.

The pivot plate 30 includes a main body 32, and two pairs of first, second support arms 34, 36 formed at two sides of the main body 32. The pair of first support arms 34 is rotatably connected to the slots 12, 13, and the pair of second support arms 36 is rotatably connected to the notches 22. In this exemplary embodiment, each first support arm 34 includes a first hinged end 342. The first hinged ends 342 are coaxially arranged and connected to the mounting portions 52, 53 of the first section 10. Each second support arm 36 includes a second hinged end 362. The second hinged ends 362 are coaxially arranged and connected to the second section 20.

The assist lever 40 includes a connecting end 42 and a driving end 44 integrally formed together. The connecting end 42 is received in the slot 14, and is connected to the mounting portion 54 of the first section 10. The driving end 44 defines a limited groove 442 and receives the cam member 62.

Figure 6:
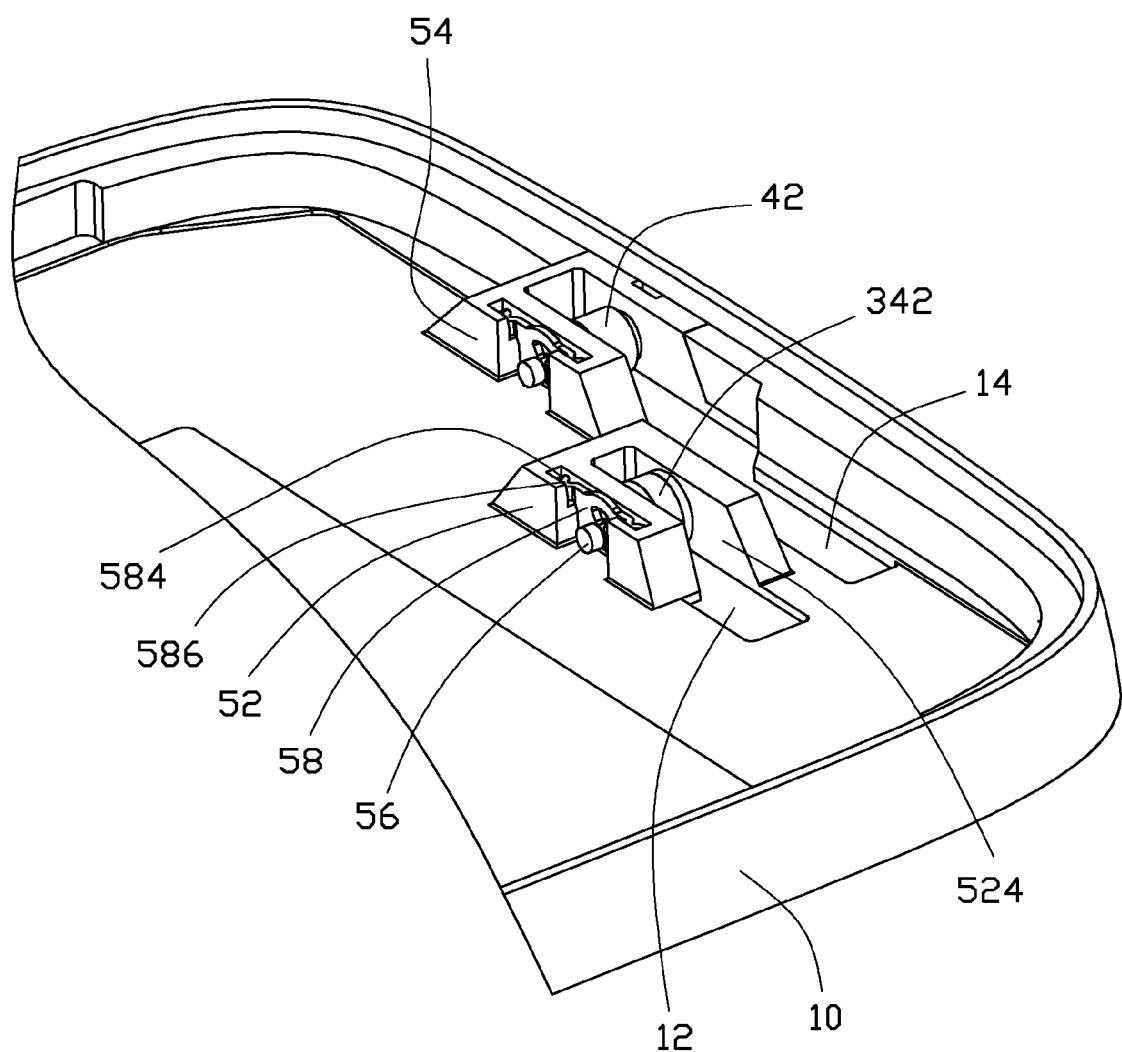
FIG. 6 is an enlarged view of the assembled connecting module in the sliding mechanism.

Referring to FIGS. 3 and 6, the three connecting modules 50 have similar structures, and so only the mounting portion 52 is described as an example. The mounting portion 52 defines a receiving groove 521 and a cutout 524 parallel to each other, thereby forming a first board 526 and a second board 528. Two latching grooves 522 are defined at opposite sides of the receiving groove 521. The cutout 524 communicates with the slot 12. The first board 526 and the second board 528 respectively define a first hole 5262 and a second hole 5282.

Figure 4:
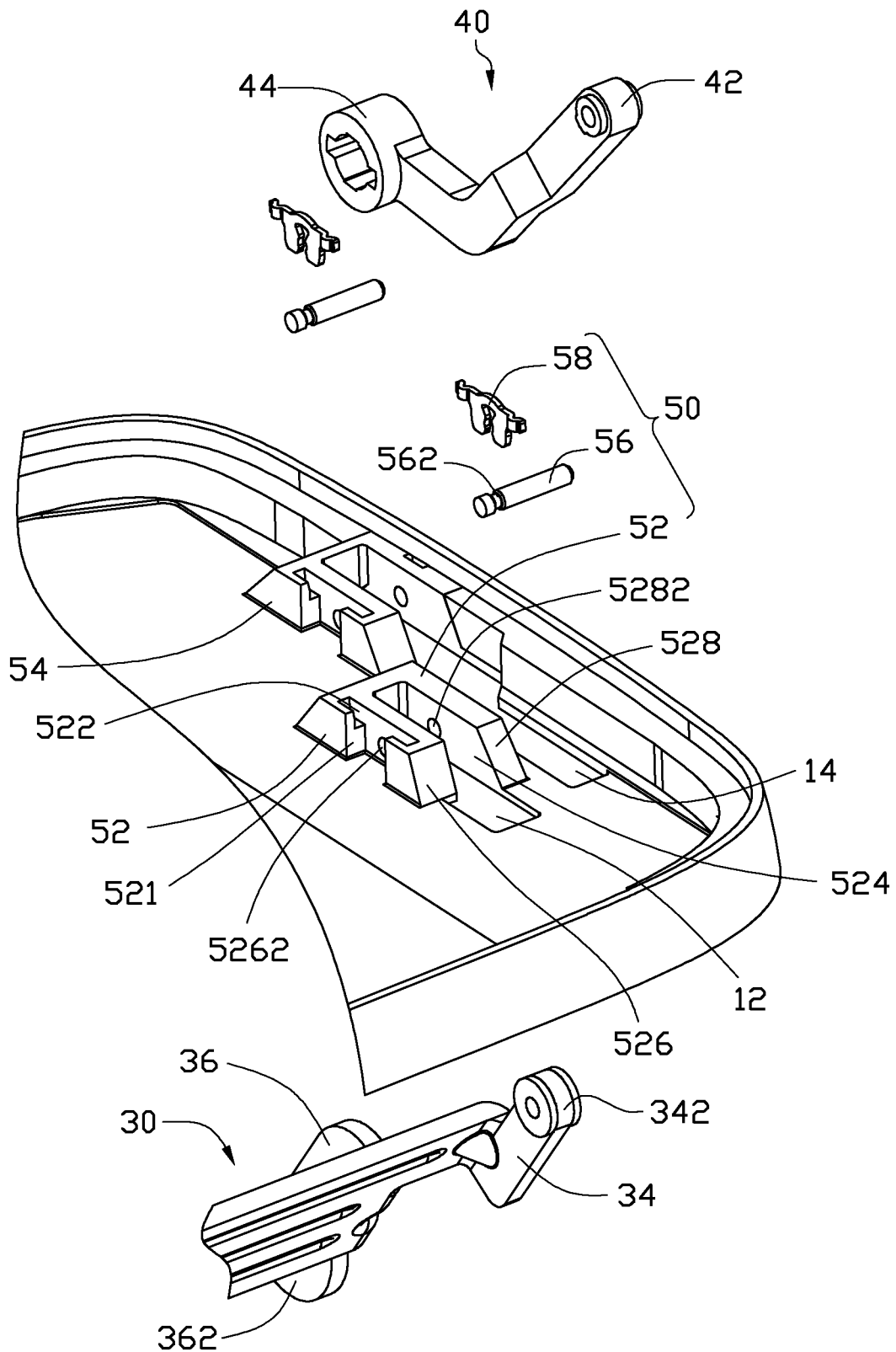
FIG. 4 is an enlarged view of one portion of the sliding mechanism including a connecting module shown in FIG. 3.

Referring to FIGS. 3 and 4, the pin 56 is configured for passing through the first hole 5262 and the second hole 5282 for connecting one end of the pivot plate 30. One end of the pin 56 defines a ring groove 562.

Figure 5:
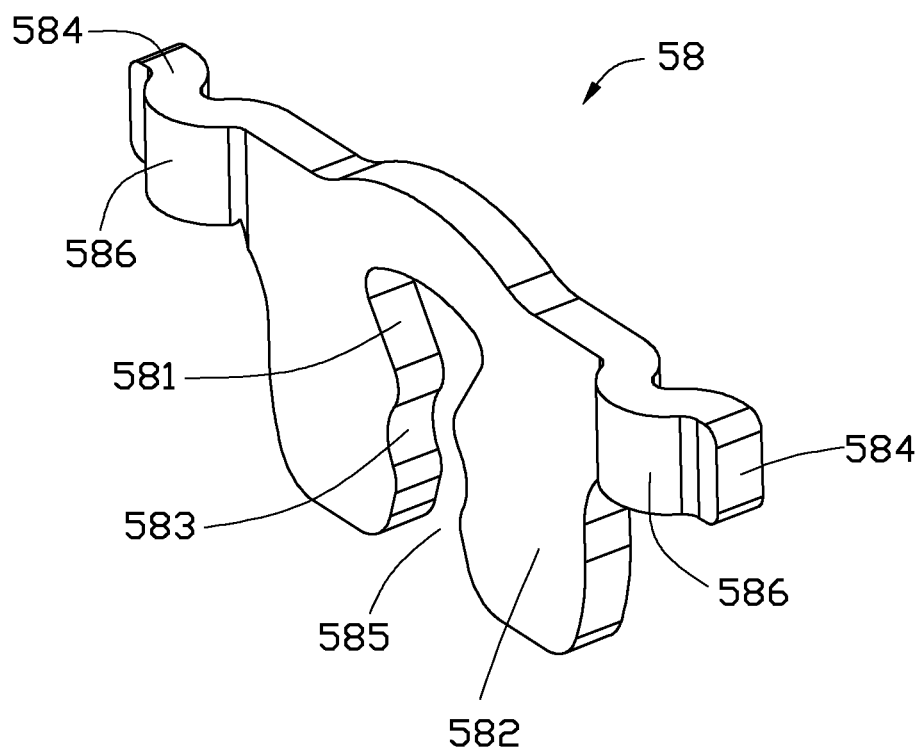
FIG. 5 is an enlarged view of a washer.

Referring to FIG. 5, the washer 58 is made of metal, and is placed on the pin 56. The washer 58 includes a washer body 582 and two extending arms 584 protruding from opposite sides of the washer body 582. Each extending arm 584 has an arcuate portion 586. The washer body 582 defines a through hole 581, an arcuate hole 583, and an opening 585. The through hole 581 is defined at a central area, and the opening 585 is defined at one side thereof. The arcuate hole 583 communicates with the through hole 581 and the opening 585. The washer 58 is engaged in the ring groove 562 of the pin 56, and the washer body 582 is received in the receiving groove 521. The extending arms 584 are latched in the latching grooves 522. The arcuate portions 585 tightly engage in the latching grooves 522 to limit play of the washer 58.

In assembly, the pivot plate 30 is connected to the first section 10 through two connecting modules 50. When one of the connecting modules 50 is assembled, the pin 56 is inserted into the first hole 5262 of the first board 526. One of the first hinged ends 342 is received in the cutout 524. Then, the pin 56 extends through the first hinged end 342, and is latched in the second hole 5282. The washer 58 is fit in the ring groove 562, and the washer body 582 is received in the receiving groove 521. The extending arms 584 are latched in the latching grooves 522. The assembly process of the other first hinged end 342 is similar to the above description, and thus is not detailed. The second support arms 36 are rotatably connected to the notches 22 for connecting the pivot plate 30 to the first section 10 and the second section 20. The hinge module 60 is positioned on the receiving portion 28. The cam member 62 is latched in the limited groove 442 to connect the driven end 44 of the assist lever 40. The connecting end 42 is connected to the first section 10 with the connecting module 50. Accordingly, the sliding mechanism 100 is assembled.

When the sliding mechanism 100 is in a flat, closed orientation, the first section 10 is parallel to and overlaps the second section 20. The first support arms 34 are received in the slots 12, and the second support arms 36 are received in the notches 22. The assist lever 50 is received in the slot 14 and the slit 24.

To open the sliding mechanism 100, a user moves the first section 10 relative to the second section 20, which causes rotation of the pivot plate 30 and the assist lever 40 which in turn angles the first section 10 to a tilted position relative to the second section 20.

The sliding mechanism 100 can be applied in a portable electronic device such as a mobile phone. The electronic device includes a cover and a housing engagable with the cover. The cover is secured to the first section 10, and the housing is secured to the second section 20. Thus, opening and closing of the portable electronic device is more reliable with use of the sliding mechanism 100. The present connecting module has a simple structure. Additionally, the connecting module effectively prevents unwanted movement of the sliding mechanism 100 with use of the washer.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A connecting module comprising:
    a mounting portion defining a receiving groove and two latching grooves positioned at opposite sides of the receiving groove;
    a pin extending through the mounting portion along a first direction;
    a washer including a washer body and two extending arms protruding from opposite sides of the washer body along a second direction perpendicular to the first direction, each extending arm having an arcuate portion protruding along the first direction;
    wherein the washer body is received in the receiving groove and is fitted around the pin, the extending arms are received in the latching grooves, and each arcuate portion is latched in a corresponding latching groove to limit play of the washer along the first direction.

2. The connecting module as claimed in claim 1, wherein the washer body defines a through hole, an arcuate hole and an opening, the through hole is defined at a central area, and the opening is defined at one side thereof, the arcuate hole communicates with the through hole and the opening.

3. The connecting module as claimed in claim 2, wherein one end of the pin defines a ring groove, and the washer body is latched in the ring groove.

4. The connecting module as claimed in claim 2, wherein the mounting portion includes a first board and a second board, the first board and the second board respectively define a first hole and a second hole, and the pin extends through the first hole and the second hole.

5. A sliding mechanism comprising:
    a first section;
    a second section;
    a pivot plate, one sides of the pivot plate rotatably connected to the first section with at least one connecting module, the other side of the pivot plate rotatably connected to the second section;
    a hinge module positioned on the second section;
    an assist lever, one end of the assist lever rotatably connected to the first section with a connecting module, the other end of the assist lever connected to the hinge module; each connecting module comprising:
    a mounting portion defining a receiving groove and two latching grooves positioned at opposite sides of the receiving groove;
    a pin extending through the mounting portion;
    a washer including a washer body and two extending arms protruding from opposite sides of the washer body, each extending arm having an arcuate portion;
    wherein the washer body is received in the receiving groove and is fitted around the pin, the extending arms are received in the latching grooves, and each arcuate portion is latched in a corresponding latching groove.

6. The sliding mechanism as claimed in claim 5, wherein the pivot plate includes a main body, and a pair of first support arms, a pair of second support arms formed at two sides of the main body, the first support arms are rotatably connected to first section, and the second support arms are rotatably connected to the second section.

7. The sliding mechanism as claimed in claim 6, wherein each first support arm includes a first hinged end, the first hinged ends are coaxially arranged to be connected to the first section, each second support includes a second hinged end, and the second hinged ends are coaxially arranged to be connected to the second section.

8. The sliding mechanism as claimed in claim 7, wherein the second section defines two notches at opposite side of a surface thereof for connecting the other side of the pivot plate, a slot is defined in the surface of the second section adjacent to one of the notches, the slot connects one end of the assist lever, and the receiving portion communicates with the slot and the adjacent notch.

9. The sliding mechanism as claimed in claim 5, wherein the assist lever includes a connecting end and a driving end integrally formed together, the connecting end is connected to the first section, the hinge module includes a cam, and the driving end is non-rotatably connected to the cam.

* * * * *